(12) United States Patent
Noguchi et al.

(10) Patent No.: US 9,939,982 B2
(45) Date of Patent: Apr. 10, 2018

(54) CONTROL OF APPLICATION BASED ON USER OPERATION ON INFORMATION PROCESSING APPARATUS

(71) Applicant: SONY CORPORATION, Tokyo (JP)

(72) Inventors: Masato Noguchi, Tokyo (JP); Kenichi Seta, Kanagawa (JP); Masatoshi Ueno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 267 days.

(21) Appl. No.: 14/533,513

(22) Filed: Nov. 5, 2014

(65) Prior Publication Data
US 2015/0135136 A1    May 14, 2015

(30) Foreign Application Priority Data

Nov. 14, 2013 (JP) ................. 2013-235883

(51) Int. Cl.
*G06F 3/0481* (2013.01)
*G06F 9/44* (2018.01)

(52) U.S. Cl.
CPC .......... *G06F 3/0481* (2013.01); *G06F 9/4443* (2013.01); *G06F 2203/04803* (2013.01)

(58) Field of Classification Search
CPC .................................................. G06F 3/0481
USPC ......................................................... 715/800
See application file for complete search history.

(56) References Cited

U.S. PATENT DOCUMENTS

| | | | | |
|---|---|---|---|---|
| 5,283,888 A | * | 2/1994 | Dao | G06F 3/16 709/237 |
| 7,477,854 B2 | * | 1/2009 | Nakazawa | G03G 15/553 399/12 |
| 2003/0142139 A1 | * | 7/2003 | Brown | G06F 3/0481 715/800 |
| 2005/0125434 A1 | * | 6/2005 | Fan | G06N 99/005 |
| 2006/0227241 A1 | * | 10/2006 | Dyke | G09G 5/06 348/384.1 |
| 2007/0094243 A1 | * | 4/2007 | Kwak | G06F 17/30867 |
| 2007/0277123 A1 | * | 11/2007 | Shin | G06F 3/04883 715/863 |
| 2009/0061837 A1 | * | 3/2009 | Chaudhri | G06F 3/0481 455/418 |
| 2009/0070678 A1 | * | 3/2009 | Landar | G06Q 10/109 715/733 |
| 2009/0085918 A1 | * | 4/2009 | Hollingworth | G06T 3/40 345/475 |
| 2009/0313544 A1 | * | 12/2009 | Wood | G06F 3/048 715/716 |
| 2010/0088633 A1 | * | 4/2010 | Sakurada | G06F 3/0416 715/790 |

(Continued)

FOREIGN PATENT DOCUMENTS

| | | |
|---|---|---|
| JP | H06-202838 A | 7/1994 |
| JP | H09-190329 A | 7/1997 |

OTHER PUBLICATIONS

Yamakita Toru, JP Publication 2002-099369(A), published Apr. 5, 2002, 15 pages.*

(Continued)

*Primary Examiner* — Reza Nabi
(74) *Attorney, Agent, or Firm* — Chip Law Group

(57) ABSTRACT

There is provided an information processing apparatus including a determination unit configured to determine, for each window, whether time decided by a certain method has elapsed since a last operation performed on a window in a display screen, and a control unit configured to shut down an application of a window for which the determination unit has determined that the time has elapsed.

14 Claims, 12 Drawing Sheets

(56) References Cited

U.S. PATENT DOCUMENTS

| | | | | |
|---|---|---|---|---|
| 2010/0115417 A1* | 5/2010 | Cox | ............... | G06F 21/305 |
| | | | | 715/740 |
| 2011/0119622 A1* | 5/2011 | Niki | ............... | G06F 3/0481 |
| | | | | 715/788 |
| 2012/0185799 A1* | 7/2012 | Tsai | ............... | G06F 9/4443 |
| | | | | 715/804 |
| 2012/0198026 A1* | 8/2012 | Roy | ............... | G06Q 30/0641 |
| | | | | 709/218 |
| 2014/0071306 A1* | 3/2014 | Kunishige | ............... | H04N 5/232 |
| | | | | 348/220.1 |
| 2014/0071307 A1* | 3/2014 | Kunishige | ............... | H04N 1/212 |
| | | | | 348/220.1 |
| 2014/0237402 A1* | 8/2014 | Pang | ............... | G06F 3/04817 |
| | | | | 715/765 |
| 2014/0337753 A1* | 11/2014 | McKellar | ............... | G06F 9/4443 |
| | | | | 715/747 |
| 2015/0094949 A1* | 4/2015 | Kato | ............... | G01C 21/3688 |
| | | | | 701/410 |
| 2015/0169181 A1* | 6/2015 | Wang | ............... | G06F 3/0488 |
| | | | | 715/765 |
| 2016/0062792 A1* | 3/2016 | Yuan | ............... | G06F 9/485 |
| | | | | 718/103 |
| 2016/0066140 A1* | 3/2016 | Gnanasekaran | ............... | H04W 4/021 |
| | | | | 455/456.3 |

OTHER PUBLICATIONS

Yamakita Torn, JP Publication 2002-099369(A), published Apr. 5, 2002, 15 pages.*

* cited by examiner

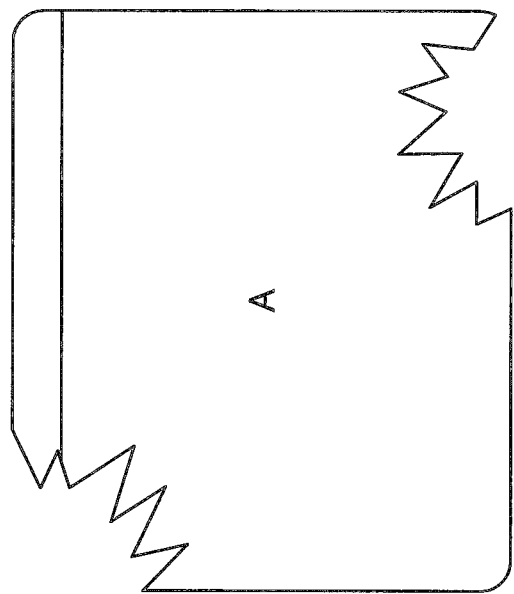
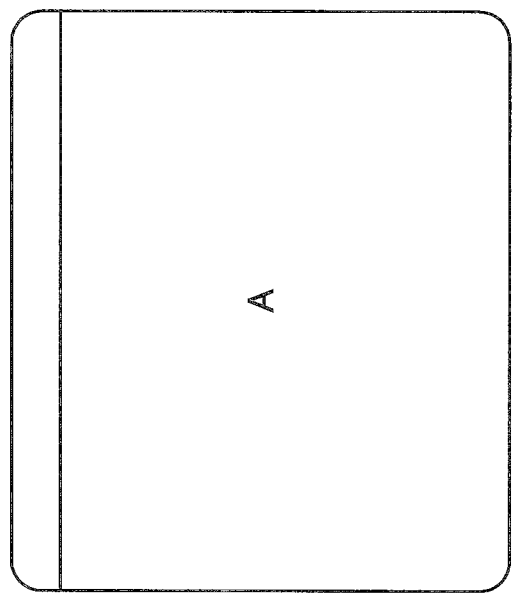
FIG. 4

CONTROL OF APPLICATION BASED ON USER OPERATION ON INFORMATION PROCESSING APPARATUS

CROSS REFERENCE TO RELATED APPLICATIONS

This application claims the benefit of Japanese Priority Patent Application JP 2013-235883 filed Nov. 14, 2013, the entire contents of which are incorporated herein by reference.

BACKGROUND

The present disclosure relates to an information processing apparatus, an information processing method, and a storage medium.

Recently, it has become common to adopt, as a function of a operating system (OS) or the like, a multi-window function by which a plurality of windows are simultaneously displayed on a screen. However, when windows are launched, visibility of the screen sometimes becomes worse. With regard to the above issue, JP H09-190329A discloses an invention that performs minimization or the like on a window that is not focused on for a certain period of time. In addition, JP H06-202838A discloses an invention that performs minimization or the like on a window that is not in a specific state such as waiting for key input from a user.

SUMMARY

According to the inventions disclosed in JP H09-190329A and JP H06-202838A, visibility of the screen is assured even if many windows are launched. However, a computational resource may be depleted. For example, the computational resource for displaying a window is shrunk by maximization or minimization of the window, but the application of the window is remaining. That is, the computational resource is still allocated to the application of the window. For example, if another window is additionally launched, available computational resources may be depleted.

Accordingly, the present disclosure proposes a novel and improved information processing apparatus, information processing method and storage medium capable of effectively using a computational resource allocated to an application of a window which is not being used.

According to an embodiment of the present disclosure, there is provided an information processing apparatus including a determination unit configured to determine, for each window, whether time decided by a certain method has elapsed since a last operation performed on a window in a display screen, and a control unit configured to shut down an application of a window for which the determination unit has determined that the time has elapsed.

According to another embodiment of the present disclosure, there is provided an information processing method including determining, for each window, whether time decided by a certain method has elapsed since a last operation performed on a window in a display screen, and shutting down an application of a window for which it has been determined that the time has elapsed.

According to an embodiment of the present disclosure, there is provided a non-transitory computer-readable storage medium having a program stored therein, the program causing a computer to function as a determination unit configured to determine, for each window, whether time decided by a certain method has elapsed since a last operation performed on a window in a display screen, and a control unit configured to shut down an application of a window for which the determination unit has determined that the time has elapsed.

As described above, according to one or more of embodiments of the present disclosure, there is provided an information processing apparatus, information processing method and storage medium capable of effectively using a computational resource allocated to an application of a window which is not being used.

Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 4 is a diagram showing a display example of a window in a standby state for shutdown of an information processing apparatus according to the first embodiment of the present disclosure;

DETAILED DESCRIPTION OF THE EMBODIMENT(S)

Figure 1:
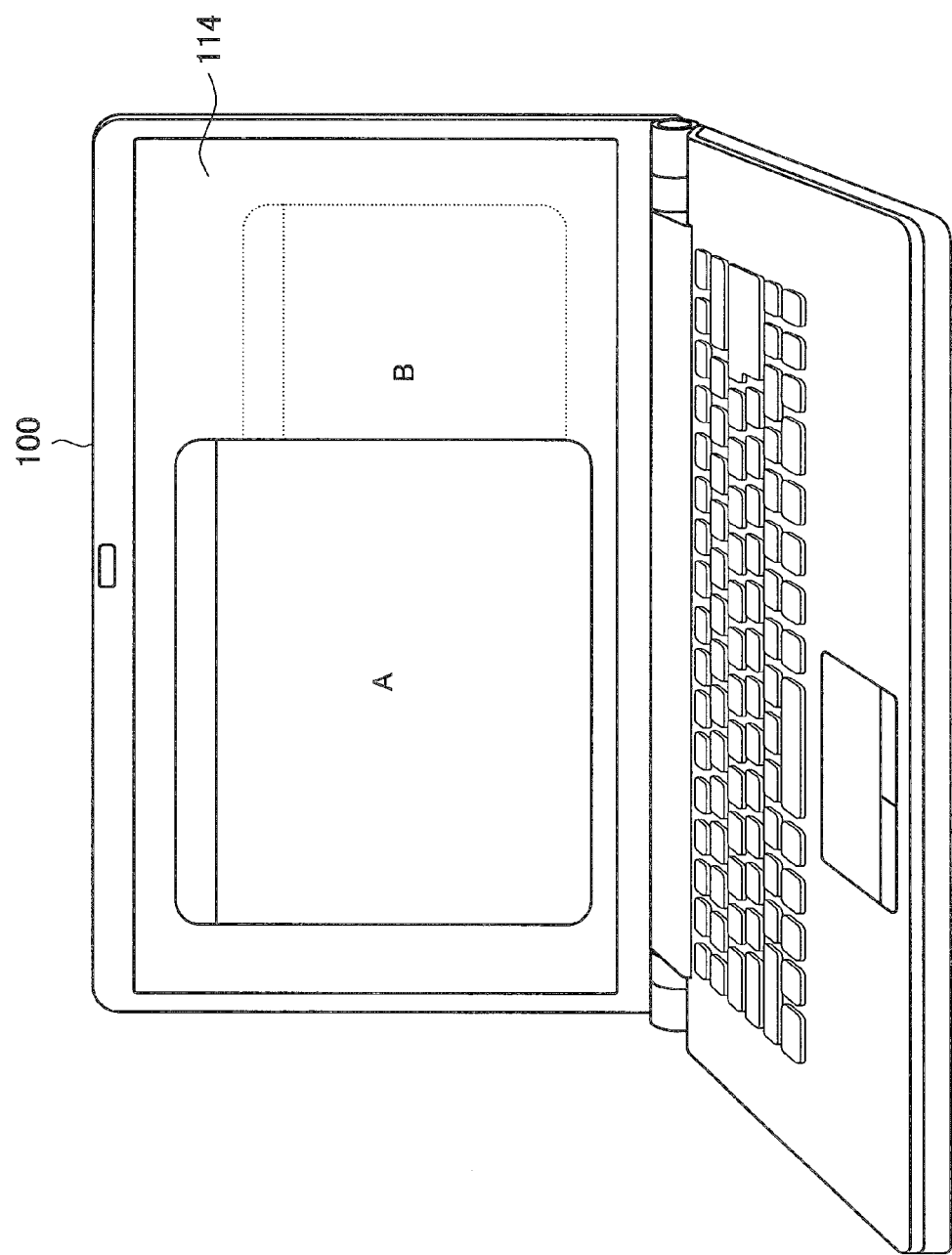
FIG. 1 is a diagram illustrating an overview of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Information Processing Apparatus according to Embodiment of Present Disclosure
2. First Embodiment of Present Disclosure
    2-1. Configuration of Information Processing Apparatus according to First Embodiment of Present Disclosure
    2-2. Processing Performed by Information Processing Apparatus according to First Embodiment of Present Disclosure
    2-3. Modifications of First Embodiment of Present Disclosure
3. Second Embodiment of Present Disclosure
    3-1. Configuration of Information Processing Apparatus according to Second Embodiment of Present Disclosure
    3-2. Processing Performed by Information Processing Apparatus according to Second Embodiment of Present Disclosure
    3-3. Modification of Second Embodiment of Present Disclosure
4. Hardware Configuration according to Embodiment of Present Disclosure
5. Conclusion

1. Overview of Information Processing Apparatus According to Embodiment of Present Disclosure First, with reference to FIG. 1, an overview of an information processing apparatus according to an embodiment of the present disclosure is explained. FIG. 1 is a diagram illustrating an overview of the information processing apparatus according to the embodiment of the present disclosure.

An information processing apparatus 100 has a multi-window function. According to the multi-window function, a part of computational resources is allocated to each application for which a window has to be displayed, and a plurality of windows relating to respective applications are generated and managed. Accordingly, the information processing apparatus 100 is capable of displaying the plurality of windows on a display unit 114 which the information processing apparatus 100 further includes. The multi-window function detects an operation performed on a window and changes display of the window in response to the operation. Accordingly, the information processing apparatus 100 is capable of changing display of the window in response to a window operation by a user via an input device such as a mouse, for example. Note that, the computational resource allocated to the application with the window is released when the window is closed and the application is shut down.

For example, as shown in FIG. 1, the information processing apparatus 100 is capable of displaying a window A and a window B on the display unit 114. In addition, the information processing apparatus 100 is capable of detecting that the user is operating the window A and displaying the window A in front of the window B.

Here, a part of the computational resources is allocated to the application every time when the window is launched. Accordingly, the computational resources may be depleted if the window remains unclosed and new windows are constantly launched. Note that, some launched windows may be neglected because purpose of the user has been already achieved. Accordingly, the information processing apparatus 100 shuts down the application of the window for which it has been determined that the purpose has been already achieved, on the basis of time elapsed after a last operation performed on the window. Moreover, if the application is suddenly shut down, it may be detrimental to the user. Accordingly, the information processing apparatus 100 changes display of the window before shutting down the application, and preliminarily notifies the user of the application to be shut down.

For example, as shown in FIG. 1, the information processing apparatus 100 may display, in a usual manner, the window A on which an operation is being performed. The information processing apparatus 100 may also display, in a translucent manner, the window B for which time has elapsed since the last operation. After additional time has elapsed, the information processing apparatus 100 shuts down the application of the window B, and the window B is deleted from the display unit 114.

As described above, the information processing apparatus 100 according to the embodiment of the present disclosure shuts down the application of the window on the basis of time elapsed after the last operation performed on the window. Accordingly, the computational resource allocated to the application of the window for which time has elapsed since the last operation is released, and the computational resource can be effectively used. Note that, FIG. 1 shows a laptop personal computer as an example of the information processing apparatus 100. However, the information processing apparatus 100 may be a desktop personal computer, a tablet terminal, a television, or the like. For convenience of explanation, information processing apparatuses 100 according to the first and second embodiment are distinguished by suffixing reference numerical corresponding to respective embodiments to the information processing apparatuses 100, such as an information processing apparatus 100-1 and an information processing apparatus 100-2.

2. First Embodiment of Present Disclosure

Figure 2:
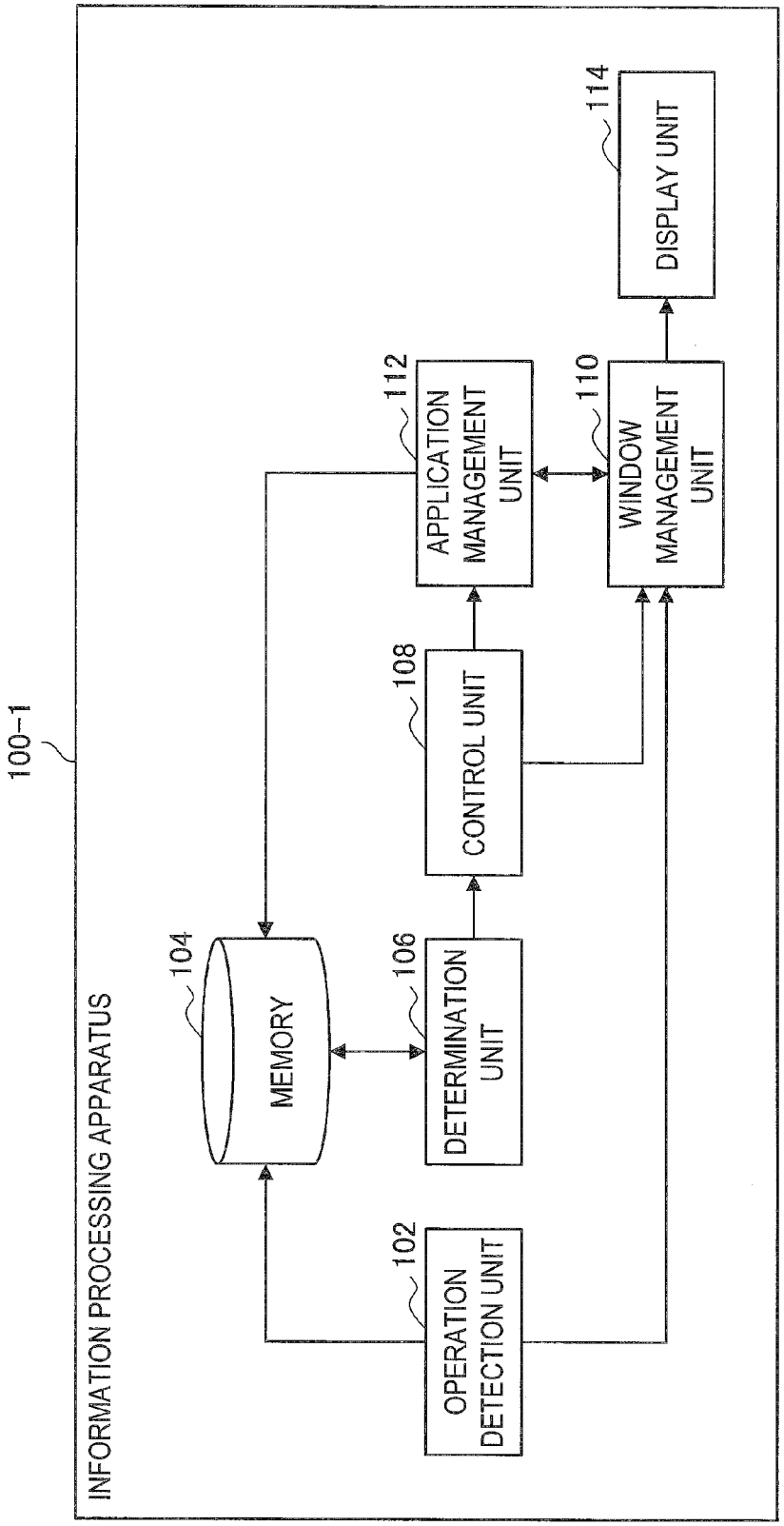
FIG. 2 is a block diagram schematically showing a functional configuration of an information processing apparatus according to a first embodiment of the present disclosure.

2-1. Configuration of Information Processing Apparatus According to First Embodiment of Present Disclosure The overview of the information processing apparatus 100 according to the embodiment of the present disclosure has been explained. Next, with reference to FIG. 2, a configuration of the information processing apparatus 100-1 according to a first embodiment of the present disclosure is explained. FIG. 2 is a block diagram schematically showing a functional configuration of the information processing apparatus 100-1 according to the first embodiment of the present disclosure.

As shown in FIG. 2, the information processing apparatus 100-1 includes an operation detection unit 102, memory 104, determination unit 106, a control unit 108, a window management unit 110, an application management unit 112, and a display unit 114.

The operation detection unit 102 detects a user operation performed on a window. Specifically, the operation detection unit 102 detects an operation performed on a window, on the basis of input information acquired from an input apparatus operated by a user. In addition, when detecting the user operation performed on the window, the operation detection unit 102 causes time when the operation has been detected to be stored in the memory 104.

The memory 104 stores temporary information about an application and a window. Specifically, the memory 104 stores information about an application process, and display information, operation information, state information, and the like of the window. For example, the operation information of the window may include stored time when the operation detection unit 102 has detected the operation performed on the window.

Figure 3:
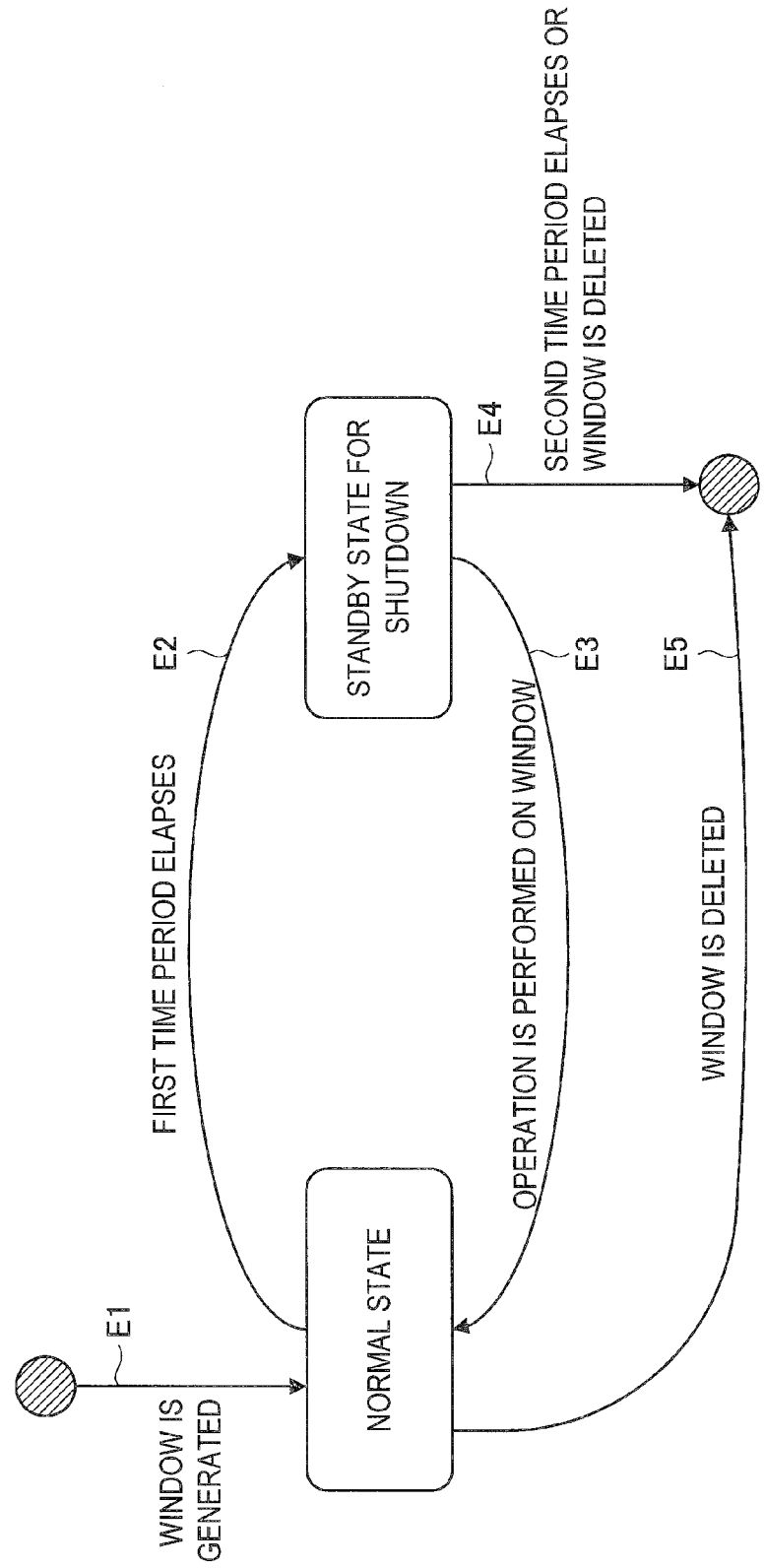
FIG. 3 is a state shift diagram of a window displayed by an information processing apparatus according to the first embodiment of the present disclosure.

The determination unit 106 determines whether to execute determination processing of window-state shift. Specifically, the determination unit 106 determines whether to change a state of a window from a normal state to a standby state for shutdown, and then the determination unit 106 determines whether to shut down the application of the window in the standby state for shutdown. Note that, the window in the standby state for shutdown is a window whose display has been changed in order to preliminarily notify the user of the application to be shut down. With reference to FIG. 3, a detailed explanation is provided. FIG. 3 is a state shift diagram of a window displayed by the information processing apparatus 100-1 according to the first embodiment of the present disclosure.

First, the generated window is in the normal state (E1). Next, the determination unit 106 calculates, for each window in the normal state, time (hereinafter, referred to as a first time period) from a last operation performed on the window to display change of the window, and determines whether the first time period has elapsed since the last operation performed on the window. Subsequently, the window for which it has been determined that the first time period has elapsed is set to the standby state for shutdown (E2). Next, in a case where an operation has been performed on the window in the standby state for shutdown, the window in the standby state for shutdown returns to the normal state (E3).

In addition, the determination unit 106 calculates, for each window in the standby state for shutdown, time (hereinafter, referred to as a second time period) from setting to the standby state for shutdown to shutting down the application, and further determines whether the second time period has elapsed since the window has set to the standby state for shutdown. Subsequently, the window for which it has been determined that the second time period has elapsed is closed, and the application of the window is shut down (E4). In a case of performing an operation to close a window in the normal state or in the standby state for shutdown, the window is closed and the application of the window is shut down (E5).

With regard to the calculation of the first time period, the determination unit 106 calculates the first time period on the basis of the how many times the standby state for shutdown has been canceled. Specifically, the determination unit 106 calculates the first time period in a manner that the first time period of a window in the standby state for shutdown becomes longer as the number of times indicating that operations have been performed on the window increases.

For example, the determination unit 106 may calculate the first time period by using a calculation formula $10*2^n$. The n represents the number of times indicating that operations have been performed on the window in the standby state for shutdown within unit time. Note that, the unit time may be a time period from start-up to shutdown of the information processing apparatus 100-1.

As described above, the determination unit 106 calculates the first time period in a manner that the first time period becomes longer as the number of times indicating that operations have been performed on the window in the standby state for shutdown increases. Accordingly, a window that a user frequently operates becomes less shiftable into the standby state for shutdown, and the number of times indicating that the user performs an operation to cancel the standby state of the window for shutdown can be reduced. The example that the determination unit 106 calculates the first time period has been described above. Alternatively, it is also possible for the determination unit 106 to determine whether the first time period has elapsed by using a certain time period stored in the memory 104 or the like. In this way, calculation processing of the first time period can be omitted. Accordingly, it is possible to accelerate processing speed of the information processing apparatus 100-1.

With regard to the calculation of the second time period, the determination unit 106 uses a certain time period as the second time period. For example, the determination unit 106 may determine whether ten minutes have elapsed since the window has been set to the standby state for shutdown. The example that the calculation methods of the first and second time periods are different has been described above. Alternatively, it is also possible for the determination unit 106 to use the same method when calculating the first and second time periods. As described above, since the second time period changes in accordance with the change of the first time period, an application having a long standby state for shutdown tends not to be easily shut down, and an application having a short standby state for shutdown tends to be easily shut down. Accordingly, convenience of the user can be improved.

Here, returning to the explanation of the configuration of the information processing apparatus 100-1 with reference to FIG. 2, the control unit 108 controls display of the window and controls the application relating to the window on the basis of a result of the determination by the determination unit 106. Specifically, the control unit 108 causes the window management unit 110 to change display of a window in the normal state for which the determination unit 106 has determined that the first time period has elapsed. In addition, the control unit 108 causes the application management unit 112 to shut down the application of the window in the standby state for shutdown for which the determination unit 106 has determined that the second time period has elapsed.

The window management unit 110 generates a window and changes display of the window. Specifically, the window management unit 110 generates a window relating to an application on the basis of an instruction from the application management unit 112. For example, when the application management unit 112 issues an instruction to display an execution result of processing of the application and an image of the execution result is provided, the window management unit 110 causes the window of the application to display the image of the execution result as instructed.

In addition, the window management unit 110 changes the display of the window to display of the standby state for shutdown on the basis of the instruction from the control unit 108. Subsequently, the window management unit 110 changes the state of the window to the standby state for shutdown, and causes the memory 104 to store time when the above-described processing has been performed. For example, the window management unit 110 may display, in a translucent manner, the window which has been received the instruction from the control unit 108, and may change the state of the window stored in the memory 104 to the standby state for shutdown.

The window management unit 110 changes the display of the window on the basis of an operation performed on the window, the operation being detected by the operation detection unit 102. In a case where the state of the window is the standby state for shutdown, the window management unit 110 changes the display of the window to the display in the normal state. Subsequently, the window management unit 110 changes the state of the window to the standby state for shutdown, and increments the number of times indicating that the state has been returned to the normal state. For example, when the operation detection unit 102 detects an operation to change a size of a window, the window management unit 110 changes the size of the window on the basis of the detected operation. Subsequently, in a case where the window is in the standby state for shutdown, the window management unit 110 changes the display of the translucent window to the display of the window in the normal state.

Note that, as an example of display of a window in the standby state for shutdown, the example that display of the window becomes translucent has been explained above. However, it is also possible for the window management unit 110 to add a filter effect to the display of the window as the display of the window in the standby state for shutdown. For example, an explanation is provided with reference to FIG. 4. FIG. 4 is a diagram showing a display example of a window in the standby state for shutdown in the information processing apparatus 100-1 according to the first embodiment of the present disclosure.

First, the window management unit 110 generates a window on the basis of an instruction from the application management unit 112. For example, as shown in the left-hand side of FIG. 4, the window management unit 110 generates a window A and causes the window A to be displayed on the display unit 114.

Next, the window management unit 110 changes the display of the window to display of the standby state for shutdown on the basis of the instruction from the control unit 108. Specifically, the window management unit 110 changes the display by adding the filter effect to the display of the window in a manner that the display is partially missed. For example, as shown in the right-hand side of FIG. 4, the window management unit 110 adds a filter effect to the window A in a manner that the display of an upper-left portion and lower-right portion of the window are missed. Subsequently, the window A to which the effect has been added may be displayed on the display unit 114. Note that, the example of the filter effect to change a shape of the display of the window has been explained above. However, it is also possible for the window management unit 110 to add a filter effect to change a color or pattern of the display of the window. For example, the window management unit 110 may add a filter effect in a manner that the color of the display of the window is changed to a monochrome tone, sepia tone, or the like. In addition, it is also possible for the window management unit 110 to apply a combination of filter effects. For example, the window management unit 110 may change the color of the display of the window to the monochrome tone and may add the filter effect in a manner that the display is partially missed.

Here, returning to the explanation of the configuration of the information processing apparatus 100-1 with reference to FIG. 2, the application management unit 112 controls generation, stop, shutdown, and the like of the application process. Specifically, the application management unit 112 transmits, to the window management unit 110, the instruction from the application process to the window relating to the application. In addition, the application management unit 112 shuts down the application process of the window in the standby state for shutdown, on the basis of the instruction from the control unit 108. More specifically, when receiving information about a deleted window from the window management unit 110, the application management unit 112 shuts down the application process of the application that corresponds with the application relating to the window whose information has been notified and that relates to the delete instruction from the control unit 108. Subsequently, the application management unit 112 causes the information that is stored in the memory 104 and that relates to the application which has been shut down to be deleted. The display unit 114 displays the window generated by the window management unit 110.

2-2. Processing Performed by Information Processing Apparatus According to First Embodiment of Present Disclosure Next, processing performed by the information processing apparatus 100-1 according to the first embodiment of the present disclosure is explained. In a case where an operation has been performed on a window, or on a periodic basis, the information processing apparatus 100-1 performs processing to shift the state of the window. The processing to be performed in the case where the operation has been performed on the window and the processing to be performed on the periodic basis are respectively explained.

Figure 5:
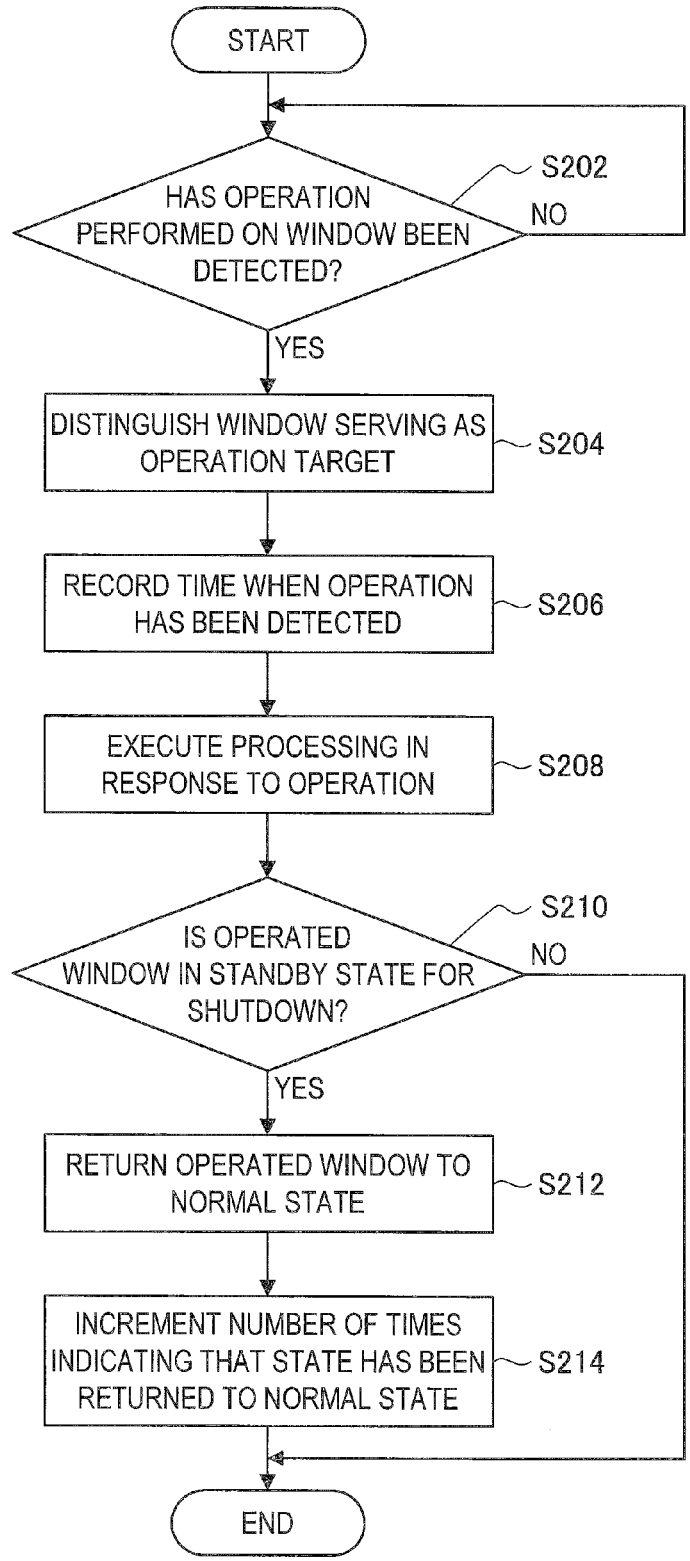
FIG. 5 is a flowchart schematically showing processing of an information processing apparatus at a time when an operation is performed on a displayed window according to the first embodiment of the present disclosure.

First, with reference to FIG. 5, processing of the information processing apparatus 100-1 at a time when an operation is performed on a displayed window is explained. FIG. 5 is a flowchart schematically showing the processing of the information processing apparatus 100-1 at the time when an operation is performed on a displayed window according to the first embodiment of the present disclosure. Note that, explanation overlapping with the explanation of the configuration of the information processing apparatus 100-1 is omitted.

First, the information processing apparatus 100-1 is on standby until the operation detection unit 102 detects an operation performed on a window (Step S202).

In Step S202, when the operation detection unit 102 has detected the operation performed on a window, the window management unit 110 distinguishes the window serving as an operation target (Step S204). Specifically, the window management unit 110 distinguishes the window on which the operation has been performed, on the basis of operation information of windows, the operation information being acquired from the operation detection unit 102 which has detected the operation. For example, the window management unit 110 may acquire an operation content and a position on a screen where an operation has been performed from the operation detection unit 102, and may specify the window on which the operation has been performed on the basis of a display position included in display information of the window stored in the memory 104 and the acquired position on the screen.

Next, the operation detection unit 102 records time when the operation has been detected (Step S206). Specifically, the operation detection unit 102 acquires time when detecting the operation performed on the window that has been distinguished in Step S204, and causes the memory 104 to store the time.

Subsequently, the information processing apparatus 100-1 executes processing in response to the operation (Step S208). Specifically, the window management unit 110 distinguishes the operation content. In a case where it has been distinguished that the detected operation is an operation relating to display change of the window, the window management unit 110 causes the display of the window to change on the basis of the operation content acquired from the operation detection unit 102. In a case where the detected operation is an operation relating to execution of processing of an application, the window management unit 110 notifies the application management unit 112 of an operation content, and the application management unit 112 executes the processing of the application on the basis of the notified operation content.

Next, the window management unit 110 determines whether the window on which the operation has been performed is in the standby state for shutdown (Step S210). Specifically, the window management unit 110 refers to the state information of the window in the memory 104, and determines whether the window on which the operation has been performed is in the standby state for shutdown (Step S210). In a case where it has been determined that the window on which the operation has been performed is in the standby state for shutdown in Step S210, the window management unit 110 returns the window on which the operation has been performed to the normal state (Step S212). Specifically, the window management unit 110 changes the display of the window from the display of the standby state for shutdown to the display of the normal state. In addition, the window management unit 110 changes the state information of the window sored in the memory 104 from the standby state for shutdown to the normal state.

Subsequently, the window management unit 110 increments the number of times indicating that the state has been returned to the normal state (Step S214). Specifically, the window management unit 110 increments the number of operations performed when the window is in the standby state for shutdown, the number of operations being stored in the memory 104. In a case where it has been determined that the window on which the operation has been performed is not in the standby state for shutdown in Step S210, the processing is terminated.

Figure 6:
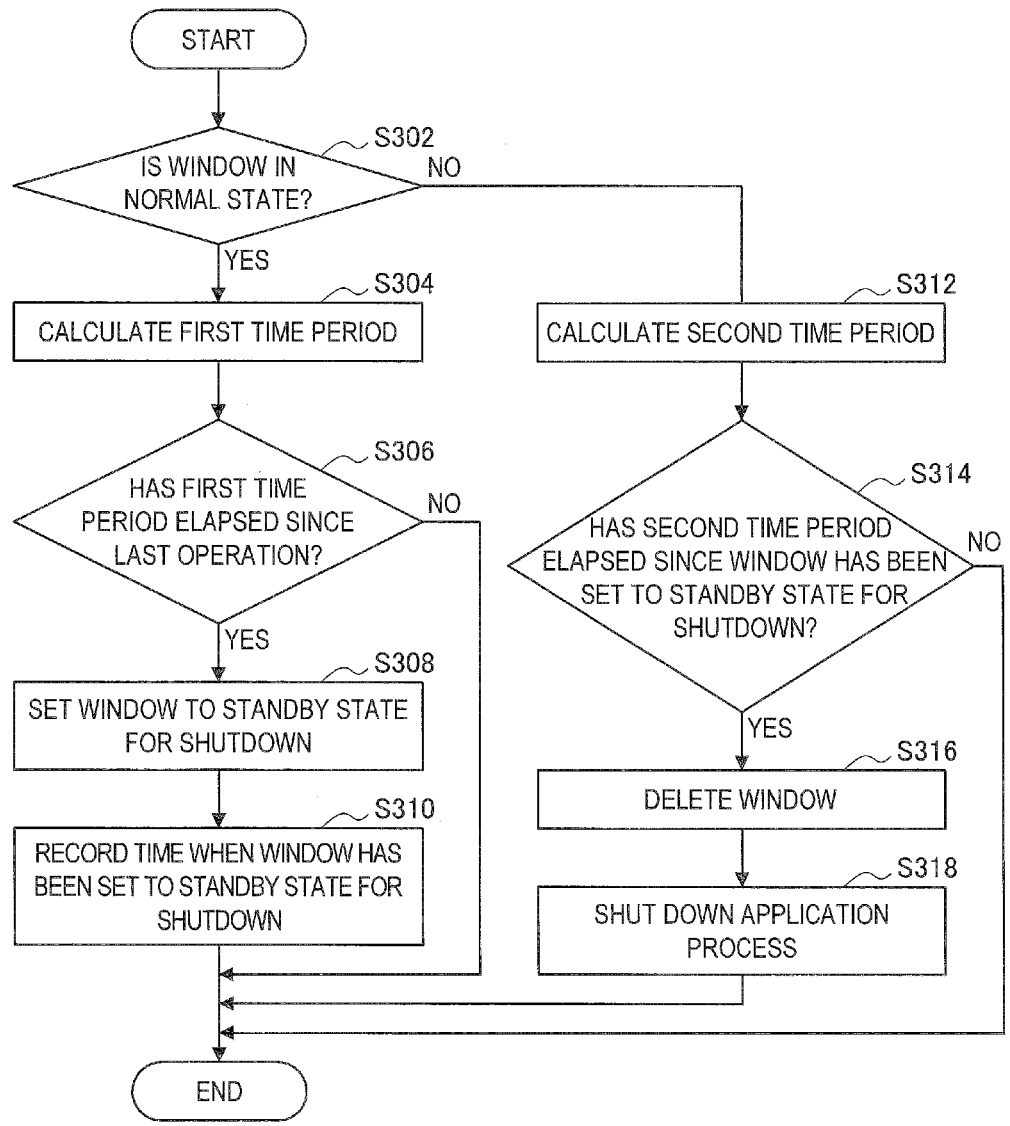
FIG. 6 is a flowchart schematically showing processing periodically performed by an information processing apparatus according to the first embodiment of the present disclosure.

Next, with reference to FIG. 6, processing periodically performed by the information processing apparatus 100-1 is explained. FIG. 6 is a flowchart schematically showing processing periodically performed by the information processing apparatus 100-1 according to the first embodiment of the present disclosure. Note that, explanation overlapping with the explanation of the configuration of the information processing apparatus 100-1 is omitted.

First, the determination unit 106 determines whether a window is in the normal state (Step S302). Specifically, the determination unit 106 determines whether the window is in the normal state with reference to state information of the window stored in the memory 104. In a case where it has been determined that the window is in the normal state in Step S302, the determination unit 106 calculates a first time period (Step S304).

Next, the determination unit 106 determines whether the first time period has elapsed since a last operation (Step S306). The determination unit 106 acquires time when the operation performed on the window has been detected, the time being stored in the memory 104, and determines whether time obtained by adding the calculated first time period to the acquired time is beyond the current time. In a case where it has been determined that the first time period has elapsed since the last operation in Step S306, the window management unit 110 sets the window to the standby state for shutdown (Step S308).

Next, the window management unit 110 records time when the window has been set to the standby state for shutdown (Step S310). In a case where it has been determined that the window is not in the normal state in Step S302, the determination unit 106 calculates a second time period (Step S312).

Next, the determination unit 106 determines whether the second time period has elapsed since the window has been set to the standby state for shutdown (Step S314). In a case where it has been determined that the second time period has elapsed since the standby state for shutdown has been set in Step S314, the window management unit 110 deletes the window (Step S316). Specifically, the control unit 108 instructs the window management unit 110 to delete the window relating to the determination. Subsequently, the window management unit 110 deletes the window on the basis of the instruction from the control unit 108.

Next, the application management unit 112 shuts down the application process (Step S318). Specifically, the control unit 108 instructs the application management unit 112 to delete the application relating to the window of which the delete instruction has been issued to the window management unit 110. Next, the application management unit 112 shuts down the application process relating to the application on the basis of the instruction from the control unit 108. Subsequently, the application management unit 112 deletes information about the application process from the memory 104.

In a case where it has been determined that the first time period has not elapsed since the last operation in Step S306, or in a case where it has been determined that the second time period has not elapsed since the window has been set to the standby state for shutdown in Step S314, the processing is terminated. The processing in the flowchart is performed on each window and is repeated for the number of the windows.

As described above, according to the first embodiment of the present disclosure, the information processing apparatus 100-1 sets the window for which the first time period has elapsed since the last operation performed on the window to the standby state for shutdown, and shuts down the application of the window for which the second time period has elapsed since the window has been set to the standby state for shutdown. Accordingly, the computational resource allocated to the application which has not been operated can be effectively used by shutting down the application of the window for which the second time period has elapsed. In addition, by setting the window to the standby state for shutdown before the application is shut down, the user can preliminarily recognizes that the application is shut down. Accordingly, it is possible to suppress a disadvantage for the user generated by shutting down the application.

The present embodiment has explained the example that the determination processing of the window-state shift is periodically performed. However, it is also possible for the information processing apparatus 100-1 to perform the determination processing of the window-state shift on the basis of a generated event. For example, the information processing apparatus 100-1 may perform the determination processing of the window-state shift after launching an additional application. In this way, in response to the generated event, the window is shifted to the standby state for shutdown, or the application of the window is shut down. Accordingly, it is possible to effectively use the display region in the screen or the computational resources in accordance with a situation of the information processing apparatus 100-1.

2-3. Modifications of First Embodiment of Present Disclosure

The first embodiment of the present disclosure has been explained above. Note that, the present embodiment is not limited to the above described examples. A first modification to a fifth modification of the present embodiment are explained below.

(First Modification)

Figure 7:
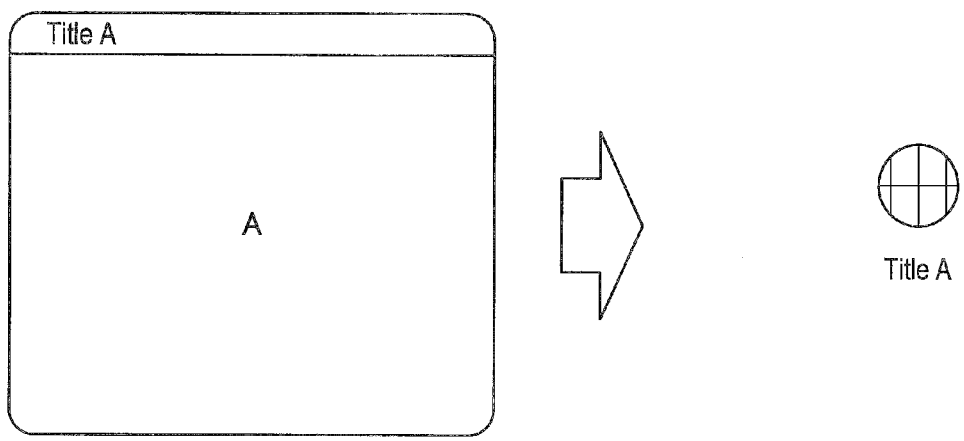
FIG. 7 is a diagram showing an example of iconizing a window displayed in the information processing apparatus according to a first modification of the first embodiment of the present disclosure.

According to the first modification of the present embodiment, the window management unit 110 may change a window to be an object relatively smaller than the window, as an example of display in the standby state for shutdown. Specifically, the window management unit 110 changes a window for which the determination unit 106 has determined that the first time period has elapsed to be an icon relatively smaller than the window. For example, an explanation is provided with reference to FIG. 7. FIG. 7 is a diagram showing an example of iconizing a window displayed in the information processing apparatus 100-1 according to the first modification of the first embodiment of the present disclosure.

First, the window management unit 110 generates a window on the basis of an instruction from the application management unit 112, and causes the display unit 114 to display the generated window. For example, as shown in the left-hand side of FIG. 7, the window management unit 110 generates a window A and causes the window A to be displayed on the display unit 114.

Next, the window management unit 110 changes, to an icon, a window for which the determination unit 106 has determined that the first time period has elapsed since the last operation performed on the window. For example, as shown in the right-hand side of FIG. 7, the window management unit 110 iconizes the window A in a case where the determination unit 106 has determined that the first time period has elapsed since the last operation performed on the window A. Note that, when an operation has been performed on the icon, the window management unit 110 returns the window from the standby state for shutdown to the normal state and returns the icon to the original window. It is also possible for the window management unit 110 to display an icon different in each application. According to the example in FIG. 7, an identification name of the icon is a title of the window before being iconized. However, the identification name of the icon may be an application name, a URL, or the like.

As described above, the window management unit 110 changes a window for which the determination unit 106 has determined that the first time period has elapsed to be an icon relatively smaller than the window. In this way, the display region is narrowed, and visibility of the screen can be improved.

Figure 8:
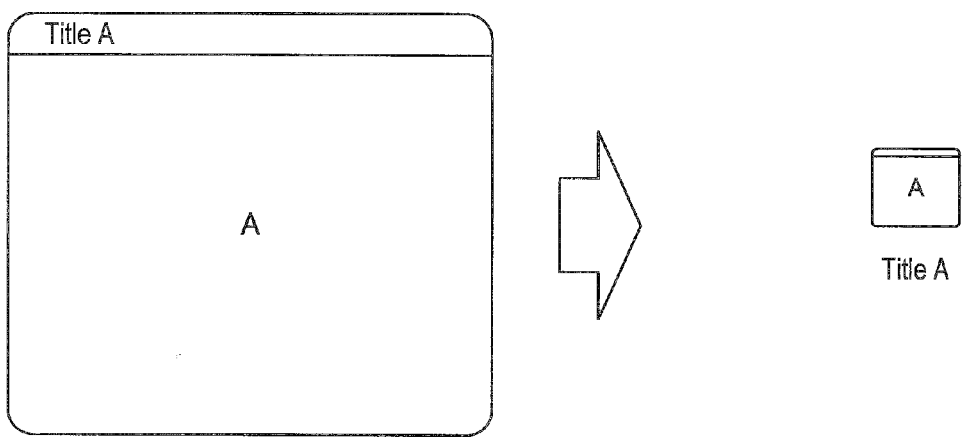
FIG. 8 is a diagram showing an example of thumbnailing a window displayed in the information processing apparatus according to the first modification of the first embodiment of the present disclosure.

Alternatively, the window management unit 110 may change a window for which the determination unit 106 has determined that the first time period has elapsed to be a thumbnail relatively smaller than the window. For example, an explanation is provided with reference to FIG. 8. FIG. 8 is a diagram showing an example of thumbnailing a window displayed in the information processing apparatus 100-1 according to the first modification of the first embodiment of the present disclosure.

First, the window management unit 110 generates a window on the basis of an instruction from the application management unit 112, and causes the display unit 114 to display the generated window. For example, as shown in the left-hand side of FIG. 8, the window management unit 110 generates a window A and causes the window A to be displayed on the display unit 114.

Next, the window management unit 110 changes, to a thumbnail, a window for which the determination unit 106 has determined that the first time period has elapsed since the last operation performed on the window. For example, as shown in the right-hand side of FIG. 8, the window management unit 110 thumbnails the window A in a case where the determination unit 106 has determined that the first time period has elapsed since the last operation performed on the window A. Note that, when an operation has been performed on the thumbnail, the window management unit 110 returns the window from the standby state for shutdown to the normal state and returns the thumbnail to the original window. In FIG. 8, an identification name of the thumbnail is a title of the window before being thumbnailed. However, the identification name of the thumbnail may be an application name, a URL, or the like.

Figure 9:
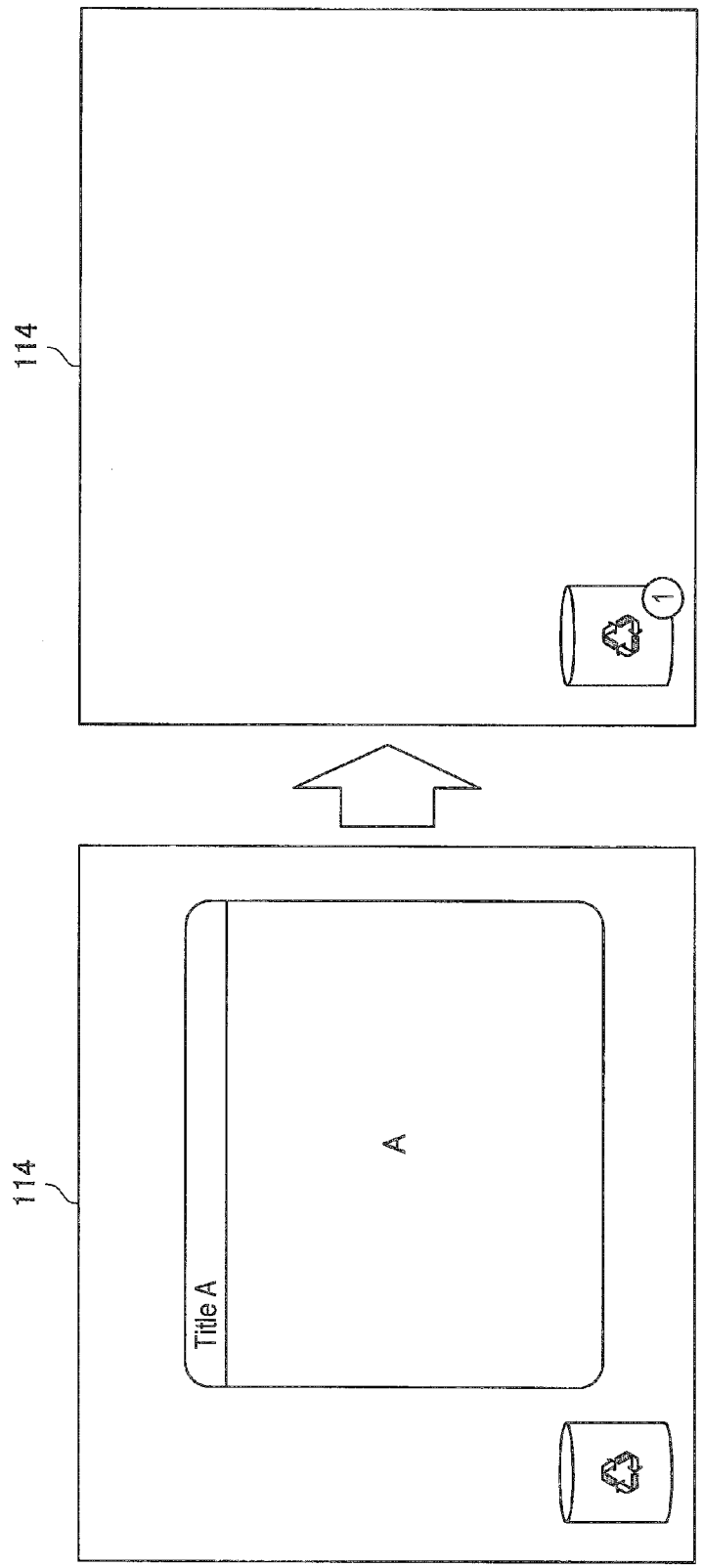
FIG. 9 is a diagram showing an example that a window displayed in the information processing apparatus is deleted and display of a trash icon is changed according to the first modification of the first embodiment of the present disclosure.

As described above, the window management unit 110 changes a window for which the determination unit 106 has determined that the first time period has elapsed into a thumbnail smaller than the window. In this way, the display region is narrowed while the window is still displayed, and the user can intuitively recognize contents of an object. Alternatively, the window management unit 110 may deletes a window for which the determination unit 106 has determined that the first time period has elapsed, and may cause information about the window to be archived in a link destination of a certain icon. For example, an explanation is provided with reference to FIG. 9. FIG. 9 is a diagram showing an example that a window displayed in the information processing apparatus 100-1 is deleted and display of a trash icon is changed according to the first modification of the first embodiment of the present disclosure.

First, the window management unit 110 generates a window on the basis of an instruction from the application management unit 112, and generates a certain icon which manages the window at a link destination. Next, the window management unit 110 causes the display unit 114 to display the generated window and the generated certain icon. For example, as shown in the left-hand side of FIG. 9, the window management unit 110 may generate a window A and a trash icon. Alternatively, it is also possible for the window management unit 110 to generate and display the trash icon after the determination unit 106 determines that the first time period has elapsed. Accordingly, the display region in the screen can be effectively used until the window becomes the standby state for shutdown.

Next, the window management unit 110 may deletes a window for which the determination unit 106 has determined that the first time period has elapsed since the last operation performed on the window, and may cause information about the window to be archived in the link destination of the certain icon. Subsequently, the window management unit 110 attaches, to the certain icon, an image indicating that there is the window in the standby state for shutdown. For example, as shown in the right-hand side of FIG. 9, the window management unit 110 may delete the window A for which the determination unit 106 has determined that the first time period has elapsed since the last operation performed on the window A. Subsequently, a number "1" may be displayed on the trash icon, the number "1" indicating that there is one window in the standby state for shutdown. Note that, when the trash icon is selected, the window management unit 110 may generate a window or the like for displaying information about the window in the standby state for shutdown, the information being stored in the link destination of the trash icon. Subsequently, when performing an operation or the like to select the information of the window in the standby state for shutdown which is displayed in the window, the window management unit 110 returns the window in the standby state for shutdown to the normal state, and causes the window to be displayed.

As described above, the window management unit 110 deletes a window for which the determination unit 106 has determined that the first time period has elapsed, and causes information about the window to be archived in a link destination of a certain icon. In this way, since a window in the standby state for shutdown is not displayed, display of windows in the standby state for shutdown does not increase in the display region in the screen, even if the windows in the standby state for shutdown increase. Accordingly, visibility of the screen can be improved.

(Second Modification)

According to the second modification of the present embodiment, the window management unit 110 may further change display of a window in the standby state for shutdown depending on time elapsed after setting to the standby state for shutdown. Specifically, the window management unit 110 changes display of a window for which the determination unit 106 has determined that the first time period has elapsed to the standby state for shutdown, and then further changes the display of the window gradually depending on the elapsed time. For example, as a display manner in the standby state for shutdown, the window management unit 110 may make a window translucent, and then increase transparency of the window depending on the elapsed time. Note that, the example of making the window translucent has been explained above. However, it is also possible for the window management unit 110 to dilute a color or a pattern of the window depending on the elapsed time, in a case of adding a filter effect relating to the color or pattern as the display manner in the standby state for shutdown. Note that, the window management unit 110 may change a form of the window depending on the elapsed time, in a case where a filter effect is added to the window, the filter effect changing the form of the window as the display manner in the standby state for shutdown.

The window management unit 110 changes display of a window for which the determination unit 106 has determined that the first time period has elapsed to the standby state for shutdown, and then further changes the display of the window after a certain time elapses. For example, as a display manner in the standby state for shutdown, the window management unit 110 may make a window translucent, and then changes the window into an icon after a half of the second time period has elapsed. Note that, the example of iconizing the window has been explained above. However, it is also possible for the window management unit 110 to thumbnail the window. In addition, the window management unit 110 may deletes a window and may cause information about the window to be archived in a link destination of a certain icon.

As described above, the window management unit 110 may further change display of a window in the standby state for shutdown depending on time elapsed after setting to the standby state for shutdown. In this way, the display is further changed after setting to the standby state for shutdown. Accordingly, the user can intuitively recognize that time when the application is shut down comes close.

(Third Modification)

As the third modification of the present embodiment, for a window of an application satisfying a certain condition, the determination unit 106 does not have to determine whether the first time period and the second time period have elapsed. Specifically, the determination unit 106 determines, for each window, whether an application of a window satisfies a certain condition stored in the memory 104, and the determination unit 106 does not determine whether the first time period and the second time period have elapsed with regard to a window of an application that has been determined to satisfy the certain condition. For example, in a case where a condition "application that performs continuous display" has been stored in the memory 104, the determination unit 106 determines that a window of a time-displaying application satisfies this condition, and does not perform a determination process on the window, for example.

Note that, it is also possible for the memory 104 to directly store an application exempt from determination. In addition, the certain condition and the application exempt from determination may be added, changed, and deleted by a user. For example, when a certain operation is performed by a user on a window, the window management unit 110 determines the window on which the operation has been performed. An example of the certain operation may be a press operation performed on an icon such as a pin displayed at an edge of a window. Subsequently, the window management unit 110 may cause the memory 104 to store the application of the window for which it has been determined that the operation has been performed, as an application exempt from the determination process. In this way, according to the operation performed by the user on a window, the application exempt from determination has been stored. Accordingly, convenience of the user can be improved.

As described above, the determination unit 106 does not perform the determination process on the window of the application corresponding to the certain condition stored in the memory 104. In this way, the widow of the application satisfying the certain condition is not deleted, and it is possible to continuously display the window satisfying the certain condition.

(Fourth Modification)

As a fourth modification of the present embodiment, the window management unit 110 displays, as an image, application shutdown display of a window of the application shut down by the application management unit 112. Subsequently, in a case where user operation is performed on the image, the application management unit 112 may run the application of the window relating to the image.

Specifically, in a case of receiving a window delete instruction from the control unit 108, the window management unit 110 stores, as an image, display of the window at the time of receiving the instruction. Next, the window management unit 110 deletes the window relating to the delete instruction and notifies the application management unit 112 of information about deleted window. Subsequently, the application management unit 112 shuts down the application process of the application that corresponds with the application of the window relating to the notification from the window management unit 110 and that relates to the shutdown instruction from the control unit 108. Here, the application management unit 112 cause the memory 104 to store a state of the shutdown application before the shutdown application has been shut down. Next, the window management unit 110 causes the display unit 114 to display the stored image.

Next, when a user operation is performed on the image, the window management unit 110 notifies the application management unit 112 of information of a window on which the operation has been performed. The application management unit 112 receives the notification and acquires, from the memory 104, the state of the application relating to the window whose information has been notified before the application has been shut down. Next, the application management unit 112 launches the application on the basis of the state before the acquired application has been shut down, and notifies the window management unit 110 of a display instruction of a window relating to the application. The window management unit 110 which has been received the notification deletes the currently-displaying image, generates a window on the basis of the display instruction of the window whose information has been notified, can cause the display unit 114 to display the generated window.

As described above, the window management unit 110 displays, as an image, application shut down display of a window of the application shut down by the application management unit 112. Subsequently, in a case where a user operation is performed on the image, the application management unit 112 may run the application of the window relating to the image. Accordingly, the computational resource can be effectively used without causing the user to be aware of the shutdown of the application.

Note that, in the present modification, the window management unit 110 may delete a displayed image of a window in the standby state for shutdown on the basis of a user operation. For example, the window management unit 110 may delete the image on which an operation such as right click on a mouse has been performed. In this way, the image is deleted, and visibility of the screen can be secured. Alternatively, the window management unit 110 may automatically delete a displayed image of a window in the standby state for shutdown. For example, the window management unit 110 may delete the image for which a predetermined time period has elapsed since the image of the window in the standby state for shutdown has been displayed. In this way, the image is automatically deleted, and convenience of the user can be improved.

Alternatively, according to the present modification, the window management unit 110 changes display in a manner that a display region of a window in the standby state for shutdown is smaller than a window in the normal state such as an icon and a thumbnail. In this way, a display region of an image of a window in the standby state for shutdown becomes smaller than a window in the normal state. Accordingly, it is possible to suppress deterioration of visibility of the screen.

(Fifth Modification)

Figure 10:
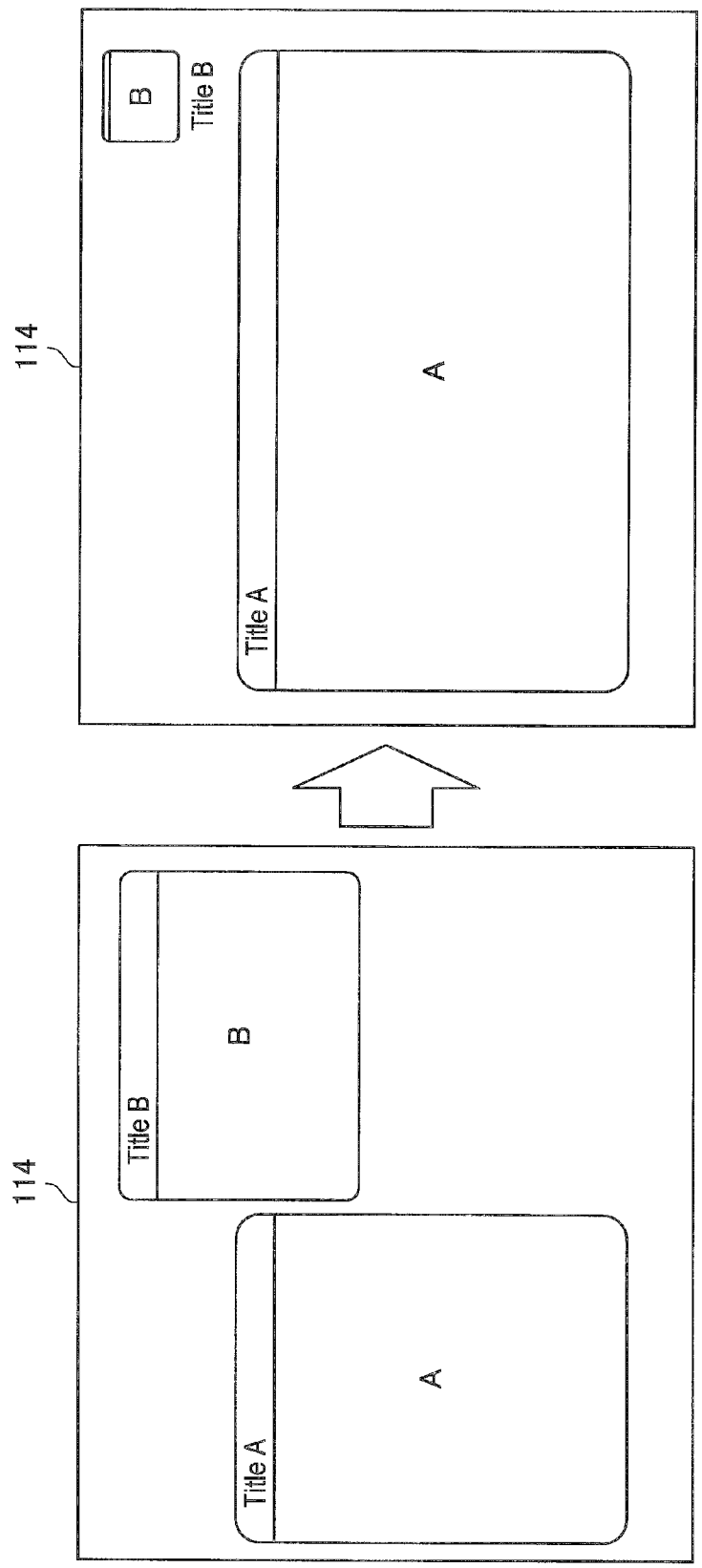
FIG. 10 is a diagram showing an example of changing a display region of a window displayed in the information processing apparatus according to a fifth modification of the first embodiment of the present disclosure.

According to a fifth modification of the present embodiment, in a case where a display region of a window has narrowed, the window management unit 110 may widen a display region of a window other than the window. Specifically, in a case where display of a window has been changed to the standby state for shutdown in which a display region is smaller than the normal state, the window management unit 110 changes a display region of a window in the normal state other than the window in a manner that the display region increases. For example, an explanation is provided with reference to FIG. 10. FIG. 10 is a diagram showing an example of changing a display region of a window displayed in the information processing apparatus 100-1 according to the fifth modification of the first embodiment of the present disclosure.

First, the window management unit 110 generates a window on the basis of an instruction from the application management unit 112, and causes the display unit 114 to display the generated window. For example, as shown in the left-hand side of FIG. 10, the window management unit 110 may cause the window A and the window B to be displayed on the display unit 114.

Next, the window management unit 110 sets, to the standby state for shutdown, a window for which the determination unit 106 has determined that the first time period has elapsed since the last operation performed on the window. For example, as shown in the right-hand side of FIG. 10, the window management unit 110 may thumbnail the window B for which the determination unit 106 has determined that the first time period has elapsed since the last operation performed on the window.

Next, the window management unit 110 increases a display region of a window in the normal state. For example, as shown in the right-hand side of FIG. 10, the window management unit 110 changes the window A in the normal state to extend in a horizontal direction while a length in a vertical direction is maintained, and the display region of the window A is increased. Note that, in a case where there are a plurality of windows in the normal state, the window management unit 110 may increase a display region of a last operated window among the plurality of windows in the normal state. In this way, the display region of the window that the user operates at this time is increased. Accordingly, convenience of the user can be improved.

As described above, in a case where a display region of a window has narrowed, the window management unit 110 widens a display region of a window other than the window. In this way, the display region of the window is automatically increased. Accordingly, visibility of the screen can be improved without causing the user to perform some operation.

3. Second Embodiment of Present Disclosure

The first embodiment of the present disclosure has been explained above. Next, a second embodiment of the present disclosure is explained. According to the second embodiment of the present disclosure, the information processing apparatus 100-2 dynamically improves a method of deciding the first time period by using machine learning.

Figure 11:
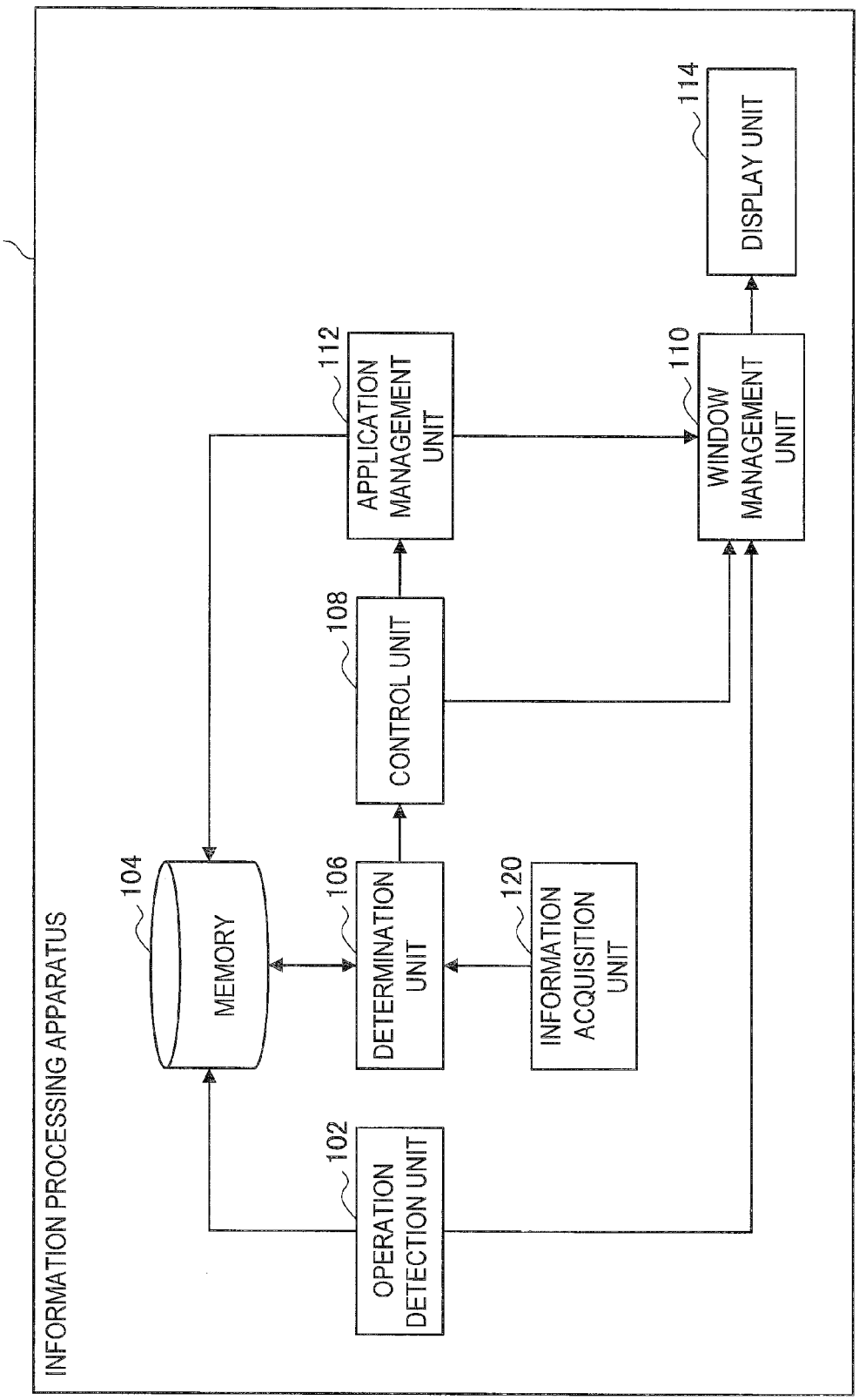
FIG. 11 is a block diagram schematically showing a functional configuration of an information processing apparatus according to a second embodiment of the present disclosure.

3-1. Configuration of Information Processing Apparatus According to Second Embodiment of Present Disclosure First, with reference to FIG. 11, a configuration of the information processing apparatus 100-2 according to the second embodiment of the present disclosure is explained. FIG. 11 is a block diagram schematically showing a functional configuration of the information processing apparatus 100-2 according to the second embodiment of the present disclosure. Note that, an explanation of a configuration substantially the same as the configuration of the information processing apparatus 100-1 according to the first embodiment of the present disclosure is omitted.

As shown in FIG. 11, the information processing apparatus 100-2 includes an operation detection unit 102, memory 104, a determination unit 106, a control unit 108, a window management unit 110, an application management unit 112, a display unit 114, and an information acquisition unit 120.

The information acquisition unit 120 acquires information for deciding the first time period. For example, the information acquisition unit 120 may acquire a computational resource utilization ratio, an operation history of a generated window, time statistics information from generation to shutdown of application of the window, current time, weather information, a feature of the use of the computational resource in an application process, information about another application relating to the application of the window, and the like. The feature of the use of the computational resource in the application process may be an occupancy ratio or occupancy time of the computational resource by the application process, for example. The information about another application relating to the application of the window may be synchronization information, communication information, or the like between the applications. Note that, the information acquisition unit 120 may acquire information from an outside of the information processing apparatus 100-2 via communication.

For each window, the determination unit 106 inputs information acquired from the information acquisition unit 120 into a function that performs the machine learning and that decides the first time period, and then calculates the first time period. Specifically, the determination unit 106 inputs information acquired from the information acquisition unit 120 into a function for deciding the first time period, and then performs determination processing on the basis of the calculated first time period. Subsequently, in a case where an application of a window that has been set to the standby state for shutdown according to the determination processing is shut down, the determination unit 106 causes the function for deciding the first time period to perform the machine learning in which the first time period relating to the determination processing and information inputted when the first time period has been calculated are treated as positive examples of teacher input. Note that, as the machine learning, common supervised leaning may be used.

Figure 12:
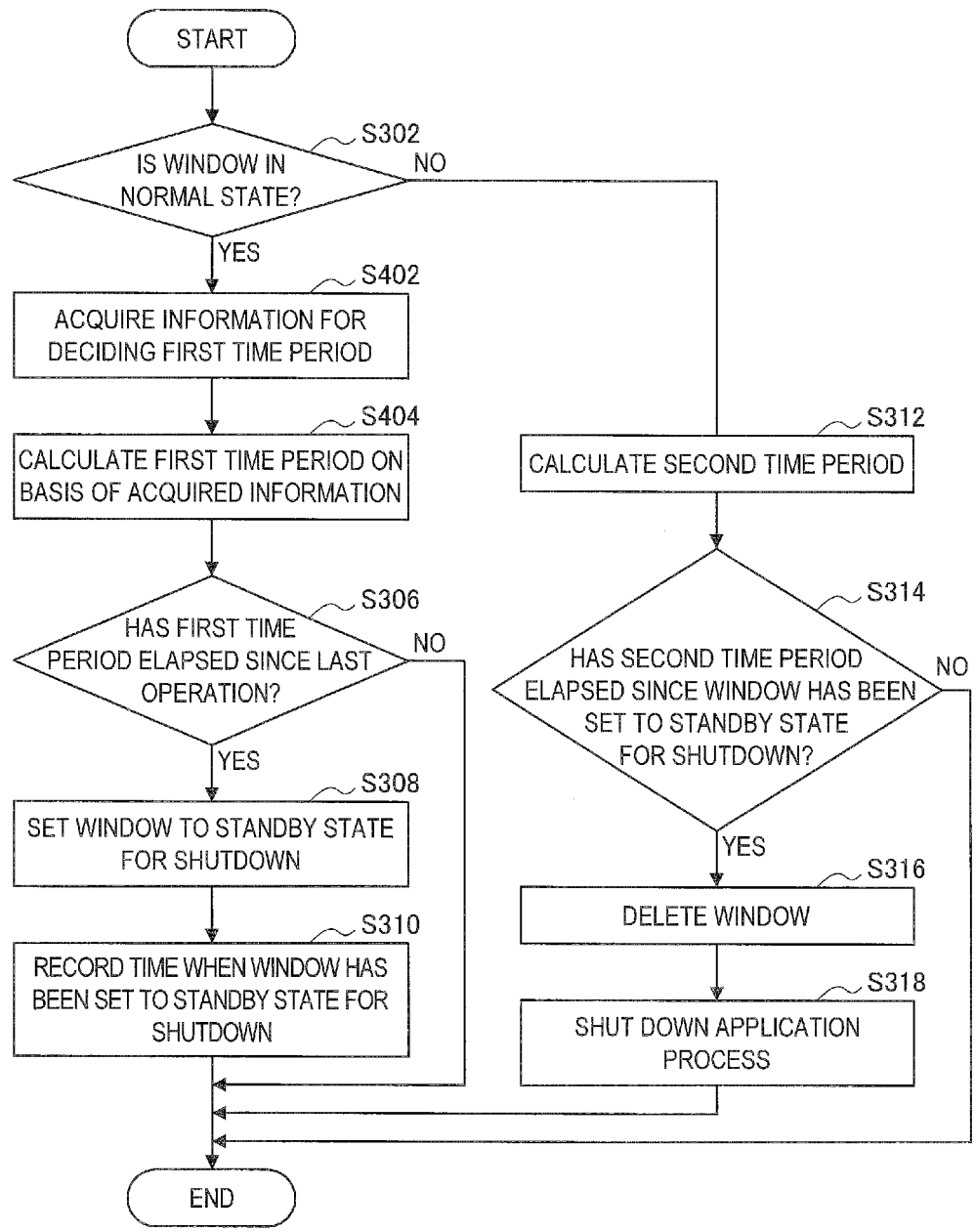
FIG. 12 is a flowchart schematically showing processing periodically performed by an information processing apparatus according to the second embodiment of the present disclosure.

3-2. Processing Performed by Information Processing Apparatus According to Second Embodiment of Present Disclosure Next, with reference to FIG. 12, determination processing of the window-state shift which is periodically performed by the information processing apparatus 100-2 in the second embodiment of the present disclosure is explained. FIG. 12 is a flowchart schematically showing processing periodically performed by an information processing apparatus according to the second embodiment of the present disclosure. Note that, a detailed explanation of processing substantially the same as the processing according to the first embodiment of the present disclosure is omitted. In a case where it has been determined that the window is in the normal state in Step S302, the information acquisition unit 120 acquires information for deciding the first time period (Step S402).

Next, the determination unit 106 calculates the first time period on the basis of the acquired information (Step S404). Specifically, the determination unit 106 inputs information acquired by the information acquisition unit 120 into a function for deciding the first time period, and then the first time period is output from the function.

As described above, according to the second embodiment of the present disclosure, the information processing apparatus 100-2 improves the function for deciding the first time period by using the machine learning in which the first time period and information acquired by the information acquisition unit 120 are treated as the teacher input. In this way, the first time period approaches an adequate value. Accordingly, a frequency of user operation for returning from the standby state for shutdown to the normal state is reduced, and convenience of the user can be improved.

According to the present embodiment, the example that the method of deciding the first time period is improved by using the machine learning has been explained. However, it is also possible for the information processing apparatus 100-2 to improve a method of deciding the second time period by using the machine learning. For example, the determination unit 106 may case a function for deciding the second time period to perform the supervised leaning in which the second time period and information inputted at the time when the second time period has been calculated are treated as input, in a case where an application has not been restarted within a certain time period after the second time period has elapsed and the application in the standby state for shutdown has been shut down. In this way, the second time period approaches an adequate value. Accordingly, a frequency at which an application is deleted against an intention of a user is reduced, and convenience of the user can be improved.

3-3. Modification of Second Embodiment of Present Disclosure

The second embodiment of the present disclosure has been explained above. Note that, the present embodiment is not limited to the above described examples. A modification of the present embodiment is explained below.

According to the modification of the present embodiment, in a case where an operation has been performed on a window in the standby state for shutdown, the determination unit 106 sets the first time period as a negative example of teacher input in the machine learning. Specifically, the determination unit 106 inputs information acquired by the information acquisition unit 120 into a function for deciding the first time period, and then performs determination processing on the basis of the calculated first time period. Subsequently, in a case where a window that has been set to the standby state for shutdown according to the determination processing is returned to the normal state by a user operation, the determination unit 106 causes the function for deciding the first time period to perform machine learning in which the first time period relating to the determination processing and information inputted at the time when the first time period has been calculated are treated as a negative example of teacher input.

As described above, in a case where an operation has been performed on a window in the standby state for shutdown, the determination unit 106 sets the first time period as a negative example of teacher input in the machine learning. By using both positive example input and negative example input for the machine learning of the function for deciding the first time period, it is possible to efficiently perform the machine learning. In addition, it is also possible to cause the output first time period to approach an adequate value earlier than a case of using the positive example input only.

4. Hardware Configuration According to Embodiment of Present Disclosure

The embodiments of the present disclosure have been explained above. The processing in the information processing apparatus 100 is achieved by operating cooperatively software and hardware of the information processing apparatus 100 described below.

Figure 13:
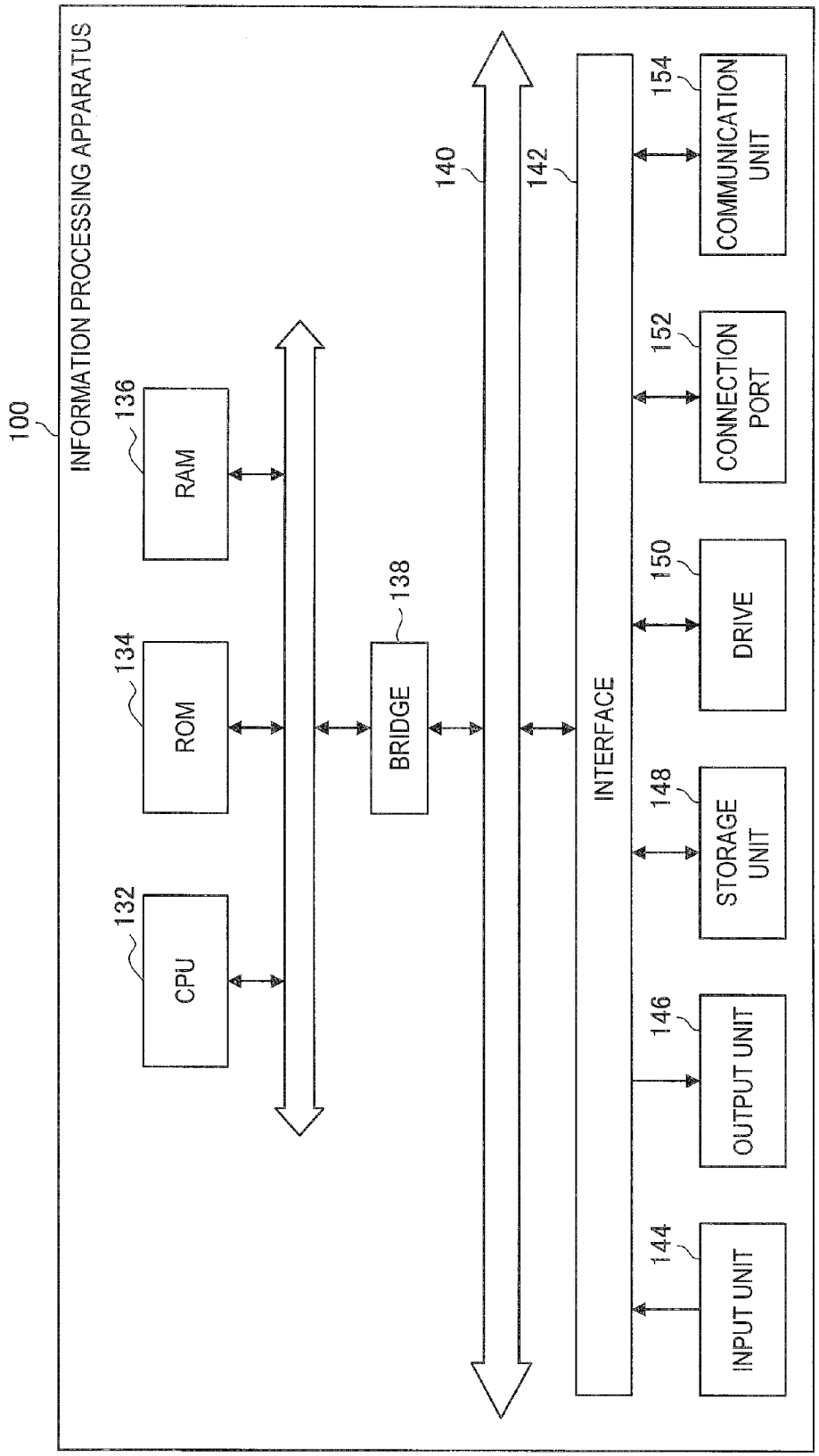
FIG. 13 is an explanatory diagram showing a hardware configuration of an information processing apparatus according to an embodiment of the present disclosure.

FIG. 13 is an explanatory diagram showing a hardware configuration of the information processing apparatus 100 according to an embodiment of the present disclosure. As illustrated in FIG. 13, the information processing apparatus 100 includes a central processing unit (CPU) 132, read only memory (ROM) 134, random access memory (RAM) 136, a bridge 138, a bus 140, an interface 142, an input unit 144, an output unit 146, a storage unit 148, a drive 150, a connection port 152, and a communication unit 154.

The CPU 132 functions as an arithmetic processing unit and a control unit, and achieves the operation detection unit 102, the determination unit 106, the control unit 108, the window management unit 110, the application management unit 112, and the information acquisition unit 120 in the information processing apparatus 100 by operating cooperatively with diverse programs. The CPU 132 may be a microprocessor. The ROM 134 stores a program, a calculation parameter, and the like used by the CPU 132. The RAM 136 transiently stores programs used when the CPU 132 is executed, and various parameters that change as appropriate when executing such programs. The ROM 134 and the RAM 136 achieves a part of the memory 104 in the information processing apparatus 100. The CPU 132, the ROM 134, and the RAM 136 are connected to each other via an internal bus configured of a CPU bus or the like.

The input unit 144 includes: an input mechanism used by the user for imputing information, such as a mouse, a keyboard, a touch screen, a button, a microphone, a switch, or a lever; an input control circuit configured to generate an input signal based on user input and to output the signal to the CPU 132; and the like. By operating the input unit 144, the user of the information processing apparatus 100 can input various data into the information processing apparatus 100 and instruct the information processing apparatus 100 to perform a processing operation. As an example of the display unit 114 of the information processing apparatus 100, the output unit 146 performs output to a liquid crystal display (LCD) device, an organic light emitting diode (OLED) device, or a lamp. Further, the output unit 146 may perform sound output to a speaker or headphones.

The storage unit 148 is a unit for data storage. The storage unit 148 may include a storage medium, a recording device which records data in a storage medium, a reader device which reads data from a storage medium, a deletion device which deletes data recorded in a storage medium, and the like. The storage unit 148 stores therein the programs executed by the CPU 132 and various data.

The drive 150 is a reader/writer for a recording medium, and is incorporated in or externally attached to the information processing device 100. The drive 150 reads information recorded on a removable recording medium that is mounted such as a magnetic disk, an optical disc, a magneto-optical disk, or semiconductor memory, and outputs the information to the RAM 134. The drive 150 also writes information to the removable recording medium.

The connection port 152 is a bus for connecting with peripheral equipment or an information processing apparatus external to the information processing apparatus 100, for example. The connection port may 152 may be a universal serial bus (USB).

The communication unit 154 is, for example, a communication interface including a communication device for connection to a network. Further, the communication unit 154 may be a device corresponding to infrared communication, a communication device corresponding to a wireless local area network (LAN), a communication device corresponding to long term evolution (LTE), or a wire communication device that performs wired communication.

5. Conclusion

According to the first embodiment of the present disclosure, the computational resource allocated to the application which has not been operated can be effectively used by shutting down the application of the window for which the second time period has elapsed. In addition, by setting the application to the standby state for shutdown before the application is shut down, the user can preliminarily recognizes that the application is shut down. Accordingly, it is possible to suppress a disadvantage for the user generated by shutting down the application. According to the second embodiment of the present disclosure, the first time period approaches an adequate value. Accordingly, a frequency of user operation for returning from the standby state for shutdown to the normal state is reduced, and convenience of the user can be improved.

It should be understood by those skilled in the art that various modifications, combinations, sub-combinations and alterations may occur depending on design requirements and other factors insofar as they are within the scope of the appended claims or the equivalents thereof.

For example, according to the above-described embodiments, the application management unit 112 shuts down the application process. However, the present technology is not limited thereto. For example, the application management unit 112 may save a state of an application process and related data on the memory in an auxiliary storage device or the like, before the application process is shut down. In this way, by reading information about the shutdown application process from the auxiliary storage device or the like, it is possible to restart the application process in a same state as before shut down. Note that, with regard to above-described processing, it may be possible to select whether to perform the processing. For example, it may be possible to select whether to perform the processing for each application.

Note that the present disclosure is not limited to the effect stated above and in addition to or in place of the effect stated above, may achieve any of the effects indicated in this specification or effects that can be understood from the specification.

Additionally, the present technology may also be configured as below:

(1) An information processing apparatus including:
 a determination unit configured to determine, for each window, whether time decided by a certain method has elapsed since a last operation performed on a window in a display screen; and
 a control unit configured to shut down an application of a window for which the determination unit has determined that the time has elapsed.

(2) The information processing apparatus according to (1), further including:

a display control unit configured to set a state of a window to a change state in which display of the window has been changed before the time has elapsed since the last operation.

(3) The information processing apparatus according to (2), wherein the certain method includes a first method configured to decide a first time period from the last operation to the change state, and a second method configured to decide a second time period from the change state to shutdown of the application, wherein the display control unit sets a window for which the determination unit has determined that the first time period has elapsed to the change state, and, after an operation is performed on the window in the change state, the display control unit returns the window from the change state to original display, and wherein the control unit shuts down the application of the window which is in the change state and for which the determination unit has determined that the second time period has elapsed.

(4) The information processing apparatus according to (3), wherein the first method is a method of deciding the first time period on the basis of how many times an operation has been performed on each window in the change state.

(5) The information processing apparatus according to (3) or (4), wherein the determination unit revises the first method by using machine learning.

(6) The information processing apparatus according to (5), wherein, in a case where an operation is performed on the window in the change state, the determination unit sets the first time period as a negative example of a teacher input in the machine learning.

(7) The information processing apparatus according to any one of (3) to (6), wherein the second method is identical with the first method.

(8) The information processing apparatus according to any one of (3) to (7), wherein the display control unit adds a filter effect to display of a window for which the determination unit has determined that the first time period has elapsed.

(9) The information processing apparatus according to any one of (3) to (7), wherein the display control unit changes a window for which the determination unit has determined that the first time period has elapsed into an object relatively smaller than the window.

(10) The information processing apparatus according to any one of (3) to (9), wherein, depending on the time that has elapsed since the display has been changed, the display control unit further changes display of the window whose display has been changed.

(11) The information processing apparatus according to any one of (1) to (10), wherein, for a window of an application satisfying a certain condition, the determination unit does not determine whether the time decided by the certain method has elapsed since the last operation performed on the window.

(12) The information processing apparatus according to any one of (2) to (10), wherein the display control unit displays, as an image, application shutdown display of a window of the application shut down by the control unit, and wherein, in a case where an operation is performed on the image, the control unit runs the application of the window relating to the image.

(13) The information processing apparatus according to any one of (2) to (10), wherein, in a case where a display region of a window narrows, the display control unit widens a display region of a window other than the window.

(14) The information processing apparatus according to any one of (1) to (13), wherein the control unit saves, in an auxiliary storage device, data of an application to be shut down in memory.

(15) An information processing method including:

determining, for each window, whether time decided by a certain method has elapsed since a last operation performed on a window in a display screen; and shutting down an application of a window for which it has been determined that the time has elapsed.

(16) A non-transitory computer-readable storage medium having a program stored therein, the program causing a computer to function as:

a determination unit configured to determine, for each window, whether time decided by a certain method has elapsed since a last operation performed on a window in a display screen; and a control unit configured to shut down an application of a window for which the determination unit has determined that the time has elapsed.

What is claimed is:

1. An information processing apparatus, comprising:
a display unit configured to display a window corresponding to an application, wherein the window is displayed in a first display state; and
circuitry configured to:
   determine an elapse of a first time period from a last operation on the window in the first display state;
   control the display unit to display the window in a second display state based on the elapse of the first time period from the last operation in the first display state;
   update the display of the window from the second display state to the first display state based on an occurrence of a subsequent operation on the window in the second display state;
   update a value of the first time period based on a number of times of the occurrence of the subsequent operation on the window in the second display state;
   determine an elapse of a second time period since the window has been set to the second display state; and
   shut down the application based on the elapse of the second time period.

2. The information processing apparatus according to claim 1,
wherein the circuitry is further configured to:
   determine the second time period from the display of the window in the second display state to the shut down of the application, and
shut down the application associated with the window in the second display state for which the second time period has elapsed.

3. The information processing apparatus according to claim 2,
wherein the circuitry is further configured to determine the second time period based on the number of times of the occurrence of the subsequent operation on the window in the second display state.

4. The information processing apparatus according to claim 1,
wherein the circuitry is further configured to revise the value of the first time period based on a machine learning process.

5. The information processing apparatus according to claim 4,
wherein, based on the occurrence of the subsequent operation on the window in the second display state, the circuitry is further configured to set the first time period as a negative example of a teacher input in the machine learning process.

6. The information processing apparatus according to claim 1,
wherein the circuitry is further configured to add a filter effect to the display of the window in the second display state based on the elapse of the first time period, and
wherein the filter effect corresponds to a change in at least one of a color, a pattern, or a shape of the window.

7. The information processing apparatus according to claim 1,
wherein the circuitry is further configured to change the window in the second display state into an object that is smaller than the window based on the elapse of the first time period.

8. The information processing apparatus according to claim 1,
wherein, based on the elapse of the second time period in the second display state, the circuitry is further configured to change the display state of the window.

9. The information processing apparatus according to claim 1, the circuitry is further configured to:
determine that the window associated with the application satisfies a condition; and
prevent the determination of the elapse of a third time period based on the window that satisfies the condition, wherein the third time period is a sum of the first time period and the second time period.

10. The information processing apparatus according to claim 1, further comprising:
a memory configured to store an image that corresponds to a state of the application before the application has been shut down,
wherein the circuitry is further configured to:
control the display unit to display the stored image of the application that has been shut down, and
run the application related to the displayed image based on the subsequent operation that corresponds to the displayed image.

11. The information processing apparatus according to claim 10,
wherein the circuitry is further configured to store data of the application to be shut down in the memory.

12. The information processing apparatus according to claim 1,
wherein the circuitry is further configured to determine at least one of the first time period or the second time period based on at least one of a computational resource utilization ratio, a current time, or weather information.

13. An information processing method, comprising:
displaying a window corresponding to an application in a first display state;
determining an elapse of a first time period from a last operation on the window in the first display state;
controlling a display unit to display the window in a second display state based on the elapse of the first time period from the last operation in the first display state;
updating the display of the window from the second display state to the first display state based on an occurrence of a subsequent operation on the window in the second display state;
updating a value of the first time period based on a number of times of the occurrence of the subsequent operation on the window in the second display state;
determining an elapse of a second time period since the window has been set to the second display state; and
shutting down the application based on the elapse of the second time period.

14. A non-transitory computer-readable medium having stored thereon, computer-executable instructions, which when executed by a computer, cause the computer to execute operations, the operations comprising:
displaying a window corresponding to an application in a first display state;
determining an elapse of a first time period from a last operation on the window in the first display state;
controlling a display unit to display the window in a second display state based on the elapse of the first time period from the last operation in the first display state;
updating the display of the window from the second display state to the first display state based on an occurrence of a subsequent operation on the window in the second display state;
updating a value of the first time period based on a number of times of the occurrence of the subsequent operation on the window in the second display state;
determining an elapse of a second time period since the window has been set to the second display state; and
shutting down the application based on the elapse of the second time period.

* * * * *